(12) United States Patent
Geier et al.

(10) Patent No.: US 9,923,231 B2
(45) Date of Patent: Mar. 20, 2018

(54) HIGH ENERGY LITHIUM BATTERY WITH SEPARATE ANOLYTE AND CATHOLYTE LAYERS

(75) Inventors: Michael Geier, Berkeley, CA (US); Ilan Gur, Washington, DC (US); Mohit Singh, Berkeley, CA (US); William Hudson, Belmont, CA (US)

(73) Assignee: Seeo, Inc., Hayward, CA (US)

( * ) Notice: Subject to any disclaimer, the term of this patent is extended or adjusted under 35 U.S.C. 154(b) by 669 days.

(21) Appl. No.: 13/390,505

(22) PCT Filed: Aug. 13, 2010

(86) PCT No.: PCT/US2010/004540
§ 371 (c)(1),
(2), (4) Date: Feb. 14, 2012

(87) PCT Pub. No.: WO2011/020073
PCT Pub. Date: Feb. 17, 2011

(65) Prior Publication Data
US 2012/0141881 A1   Jun. 7, 2012

Related U.S. Application Data

(60) Provisional application No. 61/234,147, filed on Aug. 14, 2009, provisional application No. 61/348,179, filed on May 25, 2010.

(51) Int. Cl.
*H01M 10/0562* (2010.01)
*H01M 10/056* (2010.01)
(Continued)

(52) U.S. Cl.
CPC ......... *H01M 10/056* (2013.01); *H01M 4/362* (2013.01); *H01M 4/366* (2013.01); *H01M 4/38* (2013.01); *H01M 4/40* (2013.01); *H01M 4/505* (2013.01); *H01M 4/525* (2013.01); *H01M 10/0436* (2013.01); *H01M 10/052* (2013.01); *H01M 10/0585* (2013.01);
(Continued)

(58) Field of Classification Search
CPC ........ H01M 10/046; H01M 10/0561–10/0562; H01M 10/0564; H01M 10/0565; H01M 4/366
USPC ........ 429/304, 309, 310, 313–317, 144, 145
See application file for complete search history.

(56) References Cited

U.S. PATENT DOCUMENTS 6,022,642 A * 2/2000 Tsukamoto et al. .......... 429/312
6,361,901 B1 * 3/2002 Mayes et al. ................. 429/309
(Continued)

OTHER PUBLICATIONS

M. Aldissi, "Multi-layered polymer electrolytes towards interfacial stability in lithium ion batteries," Journal of Power Sources 94 (2001) 219-224.
(Continued)

*Primary Examiner* — Jimmy Vo
(74) *Attorney, Agent, or Firm* — R'Sue Popowich Caron

(57) ABSTRACT

An optimal architecture for a polymer electrolyte battery, wherein one or more layers of electrolyte (e.g., solid block-copolymer) are situated between two electrodes, is disclosed. An anolyte layer, adjacent the anode, is chosen to be chemically and electrochemically stable against the anode active material. A catholyte layer, adjacent the cathode, is chosen to be chemically and electrochemically stable against the cathode active material.

35 Claims, 9 Drawing Sheets

(51) Int. Cl.
*H01M 4/36* (2006.01)
*H01M 4/40* (2006.01)
*H01M 4/505* (2010.01)
*H01M 4/525* (2010.01)
*H01M 10/04* (2006.01)
*H01M 10/052* (2010.01)
*H01M 10/0585* (2010.01)
*H01M 4/38* (2006.01)
*H01M 4/131* (2010.01)
*H01M 4/134* (2010.01)

(52) U.S. Cl.
CPC ............ *H01M 4/131* (2013.01); *H01M 4/134* (2013.01); *H01M 4/405* (2013.01); *H01M 2300/0071* (2013.01); *H01M 2300/0082* (2013.01); *H01M 2300/0091* (2013.01); *H01M 2300/0094* (2013.01)

(56) References Cited

U.S. PATENT DOCUMENTS

| | | | |
|---|---|---|---|
| 6,372,385 B1 * | 4/2002 | Kweon et al. | 429/231.95 |
| 6,645,675 B1 * | 11/2003 | Munshi | H01B 1/122 |
| | | | 252/62.2 |
| 2001/0041294 A1 * | 11/2001 | Chu | H01M 4/045 |
| | | | 429/231.9 |
| 2005/0058881 A1 | 3/2005 | Goebel | |
| 2006/0204845 A1 * | 9/2006 | Chang | H01M 4/364 |
| | | | 429/209 |
| 2007/0051620 A1 * | 3/2007 | Visco | H01M 4/02 |
| | | | 204/280 |
| 2007/0172739 A1 | 7/2007 | Visco | |
| 2008/0268327 A1 * | 10/2008 | Gordon et al. | 429/50 |
| 2009/0035664 A1 * | 2/2009 | Chiang et al. | 429/317 |
| 2009/0104537 A1 | 4/2009 | Deschamps | |

OTHER PUBLICATIONS

Young-Gi Lee, et al, "Submicroporous/microporous and compatible/incompatible multi-functional dual-layer polymer electrolytes and their interfacial characteristics with lithium metal anode," Journal of Power Sources 163 (2006) 264-268.

\* cited by examiner

HIGH ENERGY LITHIUM BATTERY WITH SEPARATE ANOLYTE AND CATHOLYTE LAYERS

CROSS-REFERENCE TO RELATED APPLICATIONS

This application claims priority to U.S. Provisional Patent Application 61/234,147, filed Aug. 14, 2009, to U.S. Provisional Patent Application 61/348,179, filed May 25, 2010, and to International Patent Application Number PCT/US10/45540, filed Aug. 13, 2010, all of which are incorporated by reference herein.

BACKGROUND OF THE INVENTION

Field of the Invention

This invention relates generally to electrochemical cells with polymer electrolytes, and, more specifically, to an architecture for high energy batteries that use polymer electrolytes.

Solid polymer electrolytes are attractive for lithium ion batteries, as they offer greatly enhanced stability, lifetime, and safety. Unfortunately, solid polymer electrolytes tend to have low conductivities, which have limited their use to high temperature or low-rate cell applications. The low conductivities result in severe ion transport limitations in the porous composite electrodes of the cell. Thus, to achieve optimal rate performance in solid polymer electrolyte batteries, porous electrodes must be made thinner than desirable, thereby mitigating the losses due to poor conductivity. However, such thin porous electrodes can yield low energy-density cells because the volume and weight fractions of inactive components (current collectors, separator, etc.) typically increase as the electrode thickness decreases. Thus new approaches are needed to make a solid polymer electrolyte battery with both high energy-density and moderate to high rate performance.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
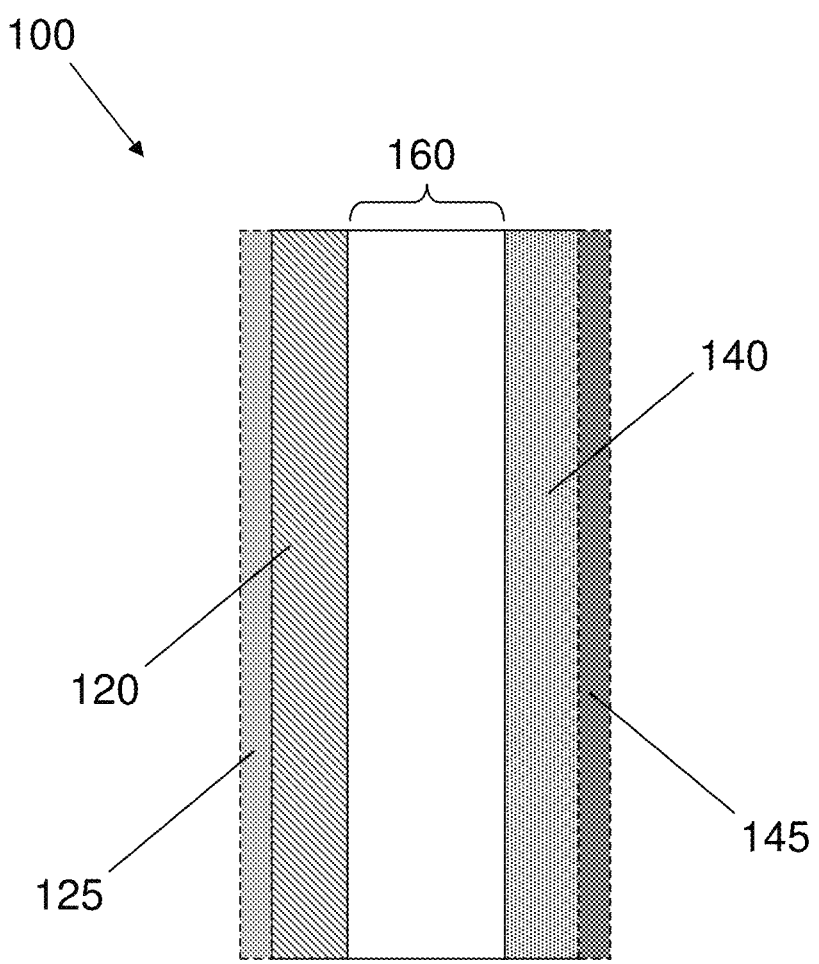
FIG. 1 is a schematic illustration of an electrochemical cell that has non-porous electrodes.

The preferred embodiments are illustrated in the context of lithium batteries. The skilled artisan will readily appreciate, however, that the materials and methods disclosed herein will have application in a number of other contexts where electrochemical cells with high energy density are desirable.

Some important ways in which rate performance of solid polymer electrolyte batteries can be limited include (1) poor charge transfer kinetics with the electrode active material, (2) bulk transport resistance of ions through the electrolyte, and (3) concentration polarization across the cell, mainly within the electrolyte in porous electrodes. Limitation (1) has to do with material properties and the total surface area between electrodes and electrolyte, while limitations (2) and (3) are highly dependent on the ratio of the cell thickness to the cross-sectional area through which ions travel across the cell.

Conventional lithium ion batteries consist of two composite porous electrodes, one on each side of a separator, wherein the pores of the electrodes and the separator are all filled with liquid electrolyte. In such a cell, energy density is generally increased by making the electrodes thicker, thereby maximizing the ratio of active electrode material to non-active components (e.g., current collectors, separator, and packaging). However, because ions must travel across the entire cell from one electrode current collector to the other (for high-energy cells, as much as 10 times the thickness of the separator alone) to achieve full depth-of-discharge, this is an untenable approach for solid polymer electrolyte systems, which thus far, tend to have lower ionic conductivities than do liquid electrolytes.

An alternative approach to obtaining high energy density is to increase the percent of active material in the electrode (relative to electrolyte and other additives), with the ultimate limit being an electrode that contains only active material—a completely homogeneous, planar, thin-film electrode. Unfortunately, such an electrode has reduced surface area for charge transfer relative to a sponge-like composite porous electrode. Such reduced surface area may result in poor charge transfer kinetics (limitation (1) above), thus limiting rate performance. There is an ideal combination of electrode thickness and electrode porosity that can maximize energy density while balancing the limitations from (2) and (3) with the kinetic limitations of (1). Planar electrodes may become advantageous if ion transport through the electrode material is comparable to or faster than ion transport in the electrolyte, if the electronic conductivity in the electrode is sufficiently high not to need conductive additives, and if the charge transfer kinetics between the electrode and the electrolyte are sufficiently fast to mitigate the significantly reduced surface area.

In the past, planar lithium metal has been used as the anode for some solid polymer electrolyte batteries. In a few cases, lithium metal has overcome the limitations discussed above, while offering a number of other advantages (i.e., no need for current collector, very high lithium storage capacity). However when paired with a planar positive electrode, solid polymer electrolyte systems have produced only very low power, low energy, thin film batteries; no system for applications such as consumer electronics has utilized a planar cathode with a lithium metal anode to make a completely non-porous, thin-film battery. It would be very advantageous to make a lithium cell with non-porous electrodes, thus minimizing or eliminating useless open space, which does not participate in the electrochemistry of the cell and thus reduces its energy density.

Definitions

In this disclosure, the terms "negative electrode" and "anode" are both used to mean negative electrode. Likewise, the terms "positive electrode" and "cathode" are both used to mean positive electrode.

It is to be understood that the terms "lithium metal" or "lithium foil," as used herein with respect to negative electrodes, are meant to include both pure lithium metal and lithium-rich metal alloys as are known in the art. Some examples of lithium-rich metal alloys suitable for use as anodes include Li—Al, Li—Si, Li—Sn, Li—Hg, Li—Zn, Li—Pb, and Li—C. There are many other Li-metal alloy suitable for use as anodes in lithium metal batteries.

The term "non-porous" is used herein to mean coherently solid, as a metal sheet or film. Of course, such a film may have random defects, such as dislocations, grain boundaries, and voids. But a "non-porous" film, as used herein, does not have voids as a significant feature. The term "minimum porosity" is used in reference to composite materials to mean as close to coherently solid as possible. For example, when electrode active material particles, optional electronically-conductive particles, and optional binder are mixed and pressed or extruded together to form an electrode film, it is not possible to eliminate all pores in the film with any scalable process. But, using the definitions provided here, such a composite film can be described as "non-porous." In one arrangement a "non-porous" film can have a pore volume of about 25% or less. In some arrangements, the pore volume in a "non-porous" film can be about 15% or less. In other arrangements, the pore volume can be about 10% or less. In yet other arrangements, the pore volume can be about 5% or less. In yet other arrangements, the pore volume can be less than 1%.

The embodiments of the invention, as disclosed herein, offer optimal architectures for polymer electrolyte batteries, wherein there are one or more layers of electrolyte between two electrodes.

As shown in FIG. 1, an electrochemical cell 100 has both a negative electrode 120 and a positive electrode 140, separated by an electrolyte layer 160. There is an optional current collector 125 in electronic communication with the anode 120. In one arrangement, the current collector 125 is a copper or aluminum foil. There is an optional current collector 145 in electronic communication with the cathode 140. In one arrangement, the current collector 145 is a copper or aluminum foil.

It is useful if the electrolyte is electrochemically stable, that is, stable against reduction at the anode and oxidation at the cathode for the range of battery potentials it experiences during normal cell cycling. This is especially difficult to achieve in lithium batteries because of the extreme reactivity of the lithium itself. Most electrolytes exhibit electrochemical stability over a limited window of about 4 Volts. Thus a single electrolyte typically cannot support an electrochemical couple that has a voltage between electrodes that is higher than 4V.

Figure 2A:
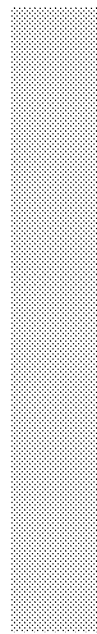
FIGS. 2A, 2B, 2C show a variety of architectures for electrodes that can be used in embodiments of the invention.
Figure 2B:
Figure 2C:
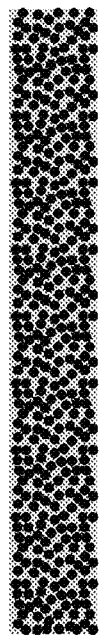

FIGS. 2A, 2B, 2C show a variety of architectures for electrodes that can be used advantageously in embodiments of the invention. Any of these electrode architectures can be used as the anode or as the cathode in any of the cells described herein. A particular cell can have two electrodes with the same architecture or it can have two different electrodes with different architectures.

FIG. 2A is a schematic cross-section of a non-porous electrode. Examples of active materials that can be used when the electrode is an anode include metals, such as lithium metal or lithium alloys. Lithium alloys that contain one or more of Al, Mg, Ag, Sn, Sb, or Pb can be used to make such anodes. Examples of active materials that can be used when the electrode is a cathode include nickel cobalt aluminum oxide (NCA), nickel cobalt manganese (NCM), $LiCoO_2$, $LiFePO_4$, $LiNiPO_4$, $LiCoPO_4$, $LiMn_2O_4$, or any combination thereof. Such non-porous electrodes can result in extremely high energy densities and can mitigate the rate limitations otherwise caused by poor transport of lithium ions through the electrolyte.

In some arrangements, the positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \le x \le 1.1$; and y is described by $0 \le y \le 0.5$. In one arrangement, the positive electrode material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \le x \le 1.1$; and y is described by $0 \le y \le 2$. In another arrangement, the positive electrode active material is described by the general formula: $Li_xM_yMn_{4-y}O_8$, where M is chosen from Fe and/or Co; x is described by $0.05 \le x \le 2$; and y is described by $0 \le y \le 4$. In another arrangement, the positive electrode active material is given by the general formula $Li_x(Fe_yM_{1-y})PO_4$, where M is chosen from transition metals such as Mn, Co and/or Ni; x is described by $0.9 \le x \le 1.1$; and y is described by $0 \le y \le 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \le x \le 0.2$. In some arrangements, the positive electrode material includes $LiNiVO_2$.

In some arrangements, the negative electrode active material can be any of a variety of materials depending on the type of chemistry for which the cell is designed. In one embodiment of the invention, the cell is a lithium or lithium ion cell. The negative electrode material can be any material that can serve as a host material (i.e., can absorb and release) lithium ions. Examples of such materials include, but are not limited to graphite, lithium metal, and lithium alloys such as Li—Al, Li—Si, Li—Sn, and Li—Mg. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials.

FIG. 2B is a schematic cross-section of an electrode that has been made using active material particles with no binder. Such an electrode can be formed by depositing and/or sintering particles of electrode active material. It is useful to minimize the porosity using any techniques available. In some arrangements, pressure is applied as the particles are sintered together. In some arrangements, the electrode is essentially non-porous. In one arrangement a "non-porous" film can have a pore volume of about 25% or less. In some arrangements, the pore volume in a "non-porous" film can be about 15% or less. In other arrangements, the pore volume can be about 10% or less. In yet other arrangements, the pore volume can be about 5% or less. In yet other arrangements, the pore volume can be less than 1%. Examples of anode active materials have been described above. Examples of cathode active materials have also been described above. In some arrangements, electronically conductive particles (e.g., carbon black, vapor-grown carbon fiber (VGCF)) are added to the active material particles before or during deposition or sintering. In other arrangements the cathode active material particles can be coated with solid electrolyte, such as polymer electrolyte or ceramic electrolyte before they are pressed together. Examples of ceramic electrolytes that can be used for coating cathode active material particles include, but are not limited to, alumina, zirconium oxide, carbon, aluminum halides, and boron halides. These materials are single ion conductors and have transference numbers for lithium near or equal to unity. Other examples of useful ceramic electrolyte materials are shown in Table 1. In other arrangements, electronic conductivity in the cathode can be enhanced by doping cathode active material particles with metal ions on their surfaces or by coating the particles with carbon or other materials that are electronically conductive.

FIG. 2C is a schematic cross-section of a non-porous electrode that has been made using active material particles and a solid polymer electrolyte binder. Active material particles, optional electronically conductive particles (e.g., carbon black, VGCF), solid polymer electrolyte, and optional additional binder can be mixed together and then formed into a composite electrode by solution casting or by extrusion. Examples of anode active materials include Li or Li alloy particles. Examples of cathode active materials include nickel cobalt aluminum oxide (NCA), nickel cobalt manganese (NCM), $LiCoO_2$, $LiFePO_4$, $LiNiPO_4$, $LiCoPO_4$, $LiMn_2O_4$, and any combination thereof. In some arrangements, electronically conductive particles (e.g., carbon black) are added to the active material particles before or during casting. In one embodiment of the invention, cathode active material particles are coated with a ceramic electrolyte coating. The coated active material particles can be mixed with a polymer electrolyte to form a positive electrode. In another embodiment of the invention, polymer electrolyte is mixed with particles of ceramic electrolyte and the mixed electrolyte is then used with either coated or uncoated cathode active material particles to form a composite electrode. In yet another embodiment of the invention, particles of ceramic electrolyte are mixed with cathode active materials. Only a small amount of polymer electrolyte is added to act as a binder to hold the ceramic electrolyte and active materials together. Examples of ceramic electrolytes that are useful for coating the cathode particles and/or for mixing with polymer electrolytes include, but are not limited to, those shown in Table 1 below.

As discussed above with reference to FIG. 1, a single electrolyte cannot support an electrochemical couple that has a voltage between electrodes that is higher than about 4V. But if two different electrolyte layers are used—one electrolyte layer that is reductively stable adjacent the negative electrode and another electrolyte layer that is oxidatively stable adjacent the positive electrode—higher voltage electrochemical cells can be both stable and robust, resulting in higher energy/power densities than traditional lower-voltage systems have.

TABLE 1

Exemplary Ceramic Electrolytes for Use with the Cathode

| Electrolyte Type | Exemplary Formulas | Mixture Proportion |
|---|---|---|
| Oxynitride glass | $Li_xPO_yN_z$ x = 2.9, y = 3.3, z = 0.46 0.24 < z < 1.2 | |
| | $Li_xBO_yN_z$ | |
| Sulfide and oxysulfide glass | $Li_2S\bullet P_2S_5$ | 0.75:0.25 |
| | $Li_2S\bullet SiS_2$ | 0.6:0.4 |
| | $Li_2S\bullet SiS_2\bullet Li_xMO_4$ M = Si, P, Ge | 0.57:0.38:0.05 |
| | $Li_2S\bullet SiS_2\bullet Li_3PO_4$ | 0.63:0.36:0.01 |
| | $Li_2S\bullet SiS_2\bullet xMS_y$ M = Sn, Ta, Ti | 0.6:0.4:0.01-0.05 |
| | $Li_2S\bullet SiS_2\bullet Li_3N$ | 0.55:0.40:0.03 |
| Li thionitride glass | $Li_3N\bullet SiS_2$ | 0.4:0.6 |
| LLTO Perovskite structure | $La_{2/3-x}Li_{3x}TiO_3$ 0.03 ≤ x ≤ 0.167 | |
| | $La_{1/3-x}Li_{3x}TaO_3$ 0.025 ≤ x ≤ 0.167 | |
| | $La_{1/3-x}Li_{3x}NbO_3$ 0 ≤ x ≤ 0.06 | |
| Nasicon-type (Lisicon) phosphate | $Li_{1.3}Ti_{1.7}Al_{0.3}(PO_4)_3$ | |
| | $LiAlTa(PO_4)_3$ | |
| | $LiAl_{0.4}Ge_{1.6}(PO_4)_3$ | |
| | $Li_{1.4}Ti_{1.6}Y_{0.4}(PO_4)_3$ | |
| | $Li_{3-2x}(Sc_{1-x}M_x)_2(PO_4)_3$ M = Zr, Ti, x = 0.1, 0.2 | |
| | $Li_3Sc_{1.5}Fe_{0.5}(PO_4)_3$ | |

*denotes that components are mixed together

Figure 3:
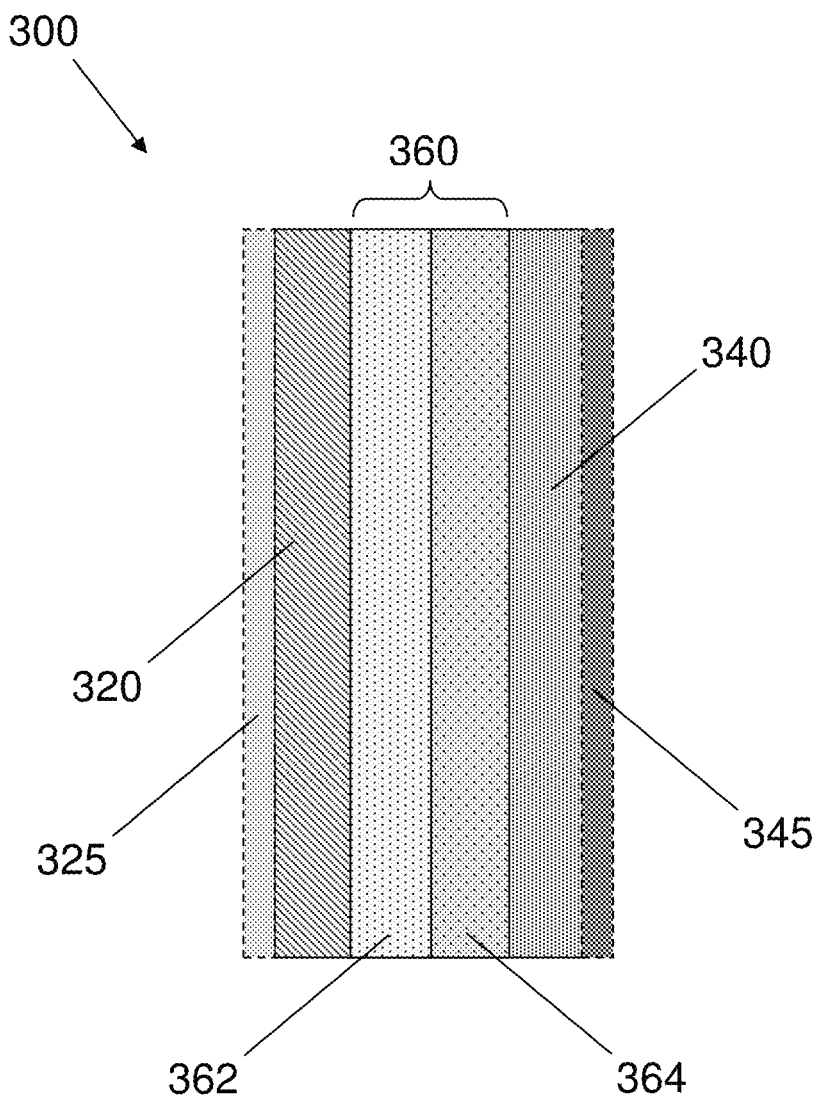
FIG. 3 is a schematic illustration of an electrochemical cell that has an anolyte and a catholyte, according to an embodiment of the invention.

In one embodiment of the invention, high voltage electrodes are used with two or more electrolyte layers to provide an enlarged electrochemical stability window. FIG. 3 is a schematic illustration that shows a bilayer electrolyte cell, according to an embodiment of the invention.

As shown in FIG. 3, an electrochemical cell 300 has a negative electrode 320 and a positive electrode 340, separated by an electrolyte region 360. The electrolyte region 360 contains two layers, an anolyte layer 362 and a catholyte layer 364. The anolyte layer 362 is reductively stable and chemically stable against the negative electrode 320. The catholyte layer 364 is oxidatively stable and chemically stable against the positive electrode 340. In some arrangements, there are one or more additional electrolyte layers (not shown) between the anolyte and the catholyte. In one arrangement, there is a current collector 325 in electronic communication with the anode 320. In one arrangement, the current collector 325 is a copper or aluminum foil. In one arrangement, there is a current collector 345 in electronic communication with the cathode 340. In one arrangement, the current collector 345 is a copper or aluminum foil.

In one embodiment of the invention, the negative electrode 320 is a lithium or lithium alloy film. Examples of useful materials include Li—Si, Li—Al, and Li—Sn alloys and others that have been discussed above. In one arrangement, the anode has minimum porosity in order to maximize energy density. In one arrangement, the cathode also has minimum porosity in order to maximize energy density. In one arrangement, the cathode has a pore volume about 25% or less. In some arrangements, the cathode has a pore volume about 15% or less. In other arrangements, the cathode has a pore volume about 10% or less. In yet other arrangements, the cathode has a pore volume about 5% or less. In yet other arrangements, the cathode has a pore volume less than 1%.

The anolyte 362 is chosen specifically for use with the negative electrode active material. In one arrangement, the anolyte 362 is a solid block copolymer electrolyte. In one embodiment of the invention, the anolyte contains no gel material. In one embodiment of the invention, the anolyte includes both lithium-conducting ceramic electrolyte and polymer electrolyte. In one arrangement, particles of the ceramic electrolyte are mixed into the polymer electrolyte and the composite is used to form an anolyte film. In another arrangement, there is a layer of ceramic electrolyte adjacent the negative electrode and a second layer of polymer electrolyte adjacent the ceramic layer—the two layers together forming the anolyte. In another arrangement, the positions of the ceramic electrolyte layer and the polymer electrolyte layer are reversed with the polymer layer adjacent the negative electrode and the ceramic layer adjacent the polymer layer. In one arrangement, a flexible ceramic electrolyte tape is used for the ceramic electrolyte layer. Examples of ceramic electrolytes that are useful in the anolyte include, but are not limited to, alumina, zirconium oxide, carbon, aluminum halides, and boron halides, oxide glasses, oxynitride glasses (e.g., LiPON), halide-doped glasses, Nasicon-type phosphates. These materials are single ion conductors and have high transference numbers for lithium.

In one embodiment of the invention, anode active material particles are coated with a ceramic electrolyte coating. The coated active material particles can be mixed with a polymer electrolyte to form a negative electrode. In another embodiment of the invention, polymer electrolyte is mixed with particles of ceramic electrolyte and the mixed electrolyte is then used with either coated or uncoated anode active material particles to form a composite electrode. In yet another embodiment of the invention, particles of ceramic electrolyte are mixed with anode active materials. Only a small amount of polymer electrolyte is added to act as a binder to hold the ceramic electrolyte and active materials together.

The anolyte 362 is reductively stable and resistant to continuous chemical and electrochemical reactions with the negative electrode 320 material. The anolyte is resistant to reduction reactions over the entire range of electrochemical cell potentials under conditions of storage and cycling. The anolyte is electrochemically stable down to the lowest operating potential of the negative electrode. For example, with Li—Al planar electrodes, it is useful if the anolyte is stable down to about 0.3V vs Li/Li$^+$. Table 2 shows reduction potentials for some other useful negative electrode materials. The anolyte is also chemically stable against the negative electrode active material. It is also useful if the anolyte has a high modulus in order to prevent dendrite growth from the negative electrode 320 during cell cycling, especially when the anode 320 is Li metal. The anolyte 362 also has good adhesion to the anode 320 to ensure good charge transfer and low interfacial impedance between the layers. If a multi-layer anolyte 362 is used, there is also good adhesion at all internal interfaces.

TABLE 2

Negative Electrode Active Material Characteristics

| Negative Electrode Active Material | Reduction Potential vs. Li/Li+ (volts) |
|---|---|
| Li—Si | 0.4 |
| Li—Al | 0.3 |
| Li—Sn | 0.5 |

In one embodiment of the invention, the active material in the positive electrode film is nickel cobalt aluminum oxide (NCA), nickel cobalt manganese (NCM), $LiCoO_2$, $LiFePO_4$, $LiNiPO_4$, $LiCoPO_4$, $LiMn_2O_4$, or any combination thereof. The catholyte 364 is chosen specifically for use with the positive electrode active 340 material. In one embodiment of the invention, the catholyte 364 is a solid block copolymer electrolyte. In one embodiment of the invention, the catholyte layer contains no gel material. In another embodiment of the invention, the catholyte 364 includes both lithium-conducting ceramic electrolyte and polymer electrolyte. Types of ceramic electrolytes that are useful in the catholyte include, but are not limited to oxide glasses, oxynitride glasses (e.g., LiPON), sulfide glasses, oxysulfide glasses, lithium nitride glasses, halide-doped glasses, LLTO, Perovskite-type ceramic electrolytes, and Lisicon-type phosphates. Examples of the ceramic electrolytes appropriate for use with the cathode are shown above in Table 1. These materials are single ion conductors and have transference numbers for lithium near or equal to unity.

In one arrangement, particles of the ceramic electrolyte are mixed into the polymer electrolyte, and the composite is used to form the catholyte film 364. In another arrangement (not shown), the catholyte 364 is made of a layer of ceramic electrolyte adjacent the positive electrode 340 and an optional second layer of polymer electrolyte adjacent the ceramic layer. In one arrangement, a flexible ceramic electrolyte tape is used for the ceramic electrolyte layer. In one arrangement, the tape is about 10-50 μm thick and is a single Li ion conductor that is stable up to 6.7 volts. In one example, the tape is provided by Ohara Glass Company. In another arrangement, the ceramic electrolyte and polymer electrolyte layers are reversed so that the polymer electrolyte is adjacent the positive electrode and the ceramic electrolyte layer is adjacent the polymer electrolyte.

In another embodiment of the invention, cathode active material particles are coated with a ceramic electrolyte coating. Examples of ceramic electrolytes that are useful for coating the cathode particles and/or for mixing with polymer electrolytes include, but are not limited to, those shown in Table 1. The coated active material particles can be mixed with a polymer electrolyte to form the positive electrode 340. In another embodiment of the invention, polymer electrolyte is mixed with particles of ceramic electrolyte and the mixed electrolyte is then used with either coated or uncoated cathode active material particles to form a composite positive electrode 340. In yet another embodiment of the invention, particles of ceramic electrolyte are mixed with cathode active materials and optional electronically conductive particles to form a cathode of the type shown in FIG. 2B. In yet another arrangement, a small amount of polymer electrolyte is added to the cathode as shown in FIG. 2B to act as a binder to ensure that the ceramic electrolyte and active materials are bonded together.

TABLE 3

Positive Electrode Active Material Characteristics

| Positive Electrode Active Material | Oxidation Potential vs. Li/Li+ (volts) |
|---|---|
| NCA | 4.0-4.3 |
| NCM | 4.0-4.3 |
| LiCoO$_2$ | 4.0-4.2 |
| LiFePO$_4$ | 3.6-4.0 |
| LiNiPO$_4$ | 4.5-5.0 |
| LiCoPO$_4$ | 4.4-4.9 |
| LiMn$_2$O$_4$ | 3.9-4.3 |

The catholyte 364 is oxidatively stable and resistant to continuous chemical and electrochemical reactions with the positive electrode 340 material. The catholyte 364 is resistant to oxidation reactions over the range of potentials that the electrochemical cell experiences under conditions of storage and cycling. In one embodiment of the invention, the catholyte layer 364 is oxidatively stable against the positive electrode up to about 4.5V vs Li/Li$^+$. In another embodiment of the invention, the catholyte layer 364 is oxidatively stable against the positive electrode up to about 5.5V vs Li/Li$^+$. In another embodiment of the invention, the catholyte layer 364 is oxidatively stable against the positive electrode up to about 6.7V vs Li/Li$^+$. Table 3 shows oxidation potentials for some other useful positive electrode materials. The catholyte is also chemically stable against the positive electrode active material. The catholyte 364 also has good adhesion to the cathode 340 to ensure good charge transfer and low interfacial impedance between the layers. If a multi-layer catholyte 364 is used, there is also good adhesion at all internal interfaces.

Figure 4:
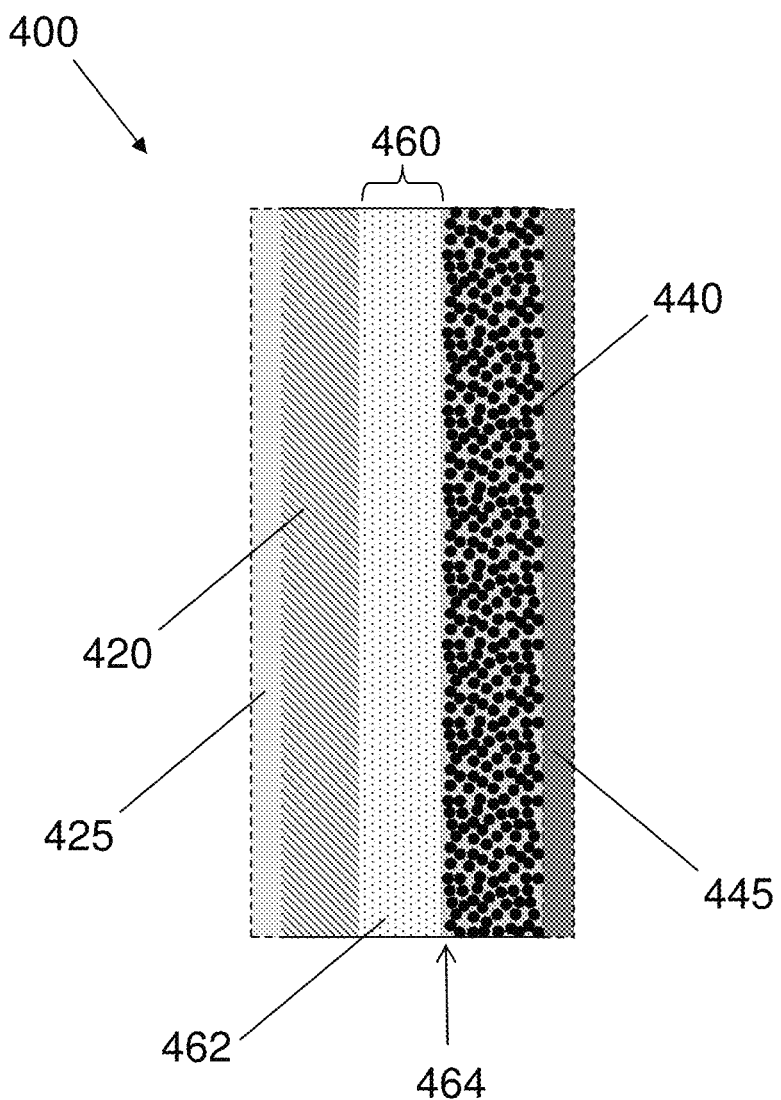
FIG. 4 is a schematic illustration of an electrochemical cell that has an anolyte and a catholyte, according to another embodiment of the invention.

As shown in FIG. 4, an electrochemical cell 400 has a negative electrode 420 and a positive electrode 440, separated by an electrolyte region 460. The positive electrode 440 is of the type shown in FIG. 2C. Cathode active material particles, optional electronically conductive particles (e.g., carbon black, VGCF), and optional binder are mixed together with solid polymer electrolyte to form the composite positive electrode 440. In one arrangement, particles of the ceramic electrolyte are mixed into the solid polymer electrolyte and the composite is used in forming the cathode 440. Examples of anode active materials include Li or Li alloy particles. Examples of cathode active materials include nickel cobalt aluminum oxide (NCA), nickel cobalt manganese (NCM), LiCoO$_2$, LiFePO$_4$, LiNiPO$_4$, LiCoPO$_4$, LiMn$_2$O$_4$, or any combination thereof. The electrolyte region 460 contains an anolyte layer 462 and a very thin layer of solid polymer electrolyte (catholyte) 464 on the surface of the positive electrode 440. The anolyte layer 462 is reductively stable and chemically stable against the negative electrode 420. The catholyte layer 464 is oxidatively stable and chemically stable against the positive electrode 440. In some arrangements, there are one or more additional electrolyte layers (not shown) between the anolyte and the catholyte.

In one arrangement, there is a current collector 425 in electronic communication with the anode 420. In one arrangement, the current collector 425 is a copper or aluminum foil. In one arrangement, the thin catholyte layer 464 provides a barrier that prevents contact between the anolyte layer 462 and the positive electrode 440 active material. In one arrangement, there is a current collector 445 in electronic communication with the cathode 440. In one arrangement, the current collector 445 is a copper or aluminum foil.

Nanostructured Block Copolymer Electrolytes

As described in detail above, a solid polymer electrolyte can be used in the embodiments of the invention. In some embodiments of the invention, a solid block copolymer electrolyte is used.

Figure 5A:
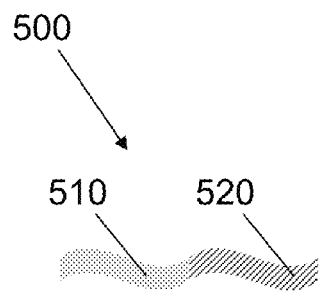
FIG. 5 is a schematic drawing of a diblock copolymer and a domain structure it can form, according to an embodiment of the invention.

FIG. 5A is a simplified illustration of an exemplary diblock polymer molecule 500 that has a first polymer block 510 and a second polymer block 520 covalently bonded together. In one arrangement both the first polymer block 510 and the second polymer block 520 are linear polymer blocks. In another arrangement, either one or both polymer blocks 510, 520 has a comb structure. In one arrangement, neither polymer block is cross-linked. In another arrangement, one polymer block is cross-linked. In yet another arrangement, both polymer blocks are cross-linked.

Figure 5B:
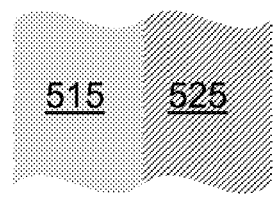
Figure 5C:
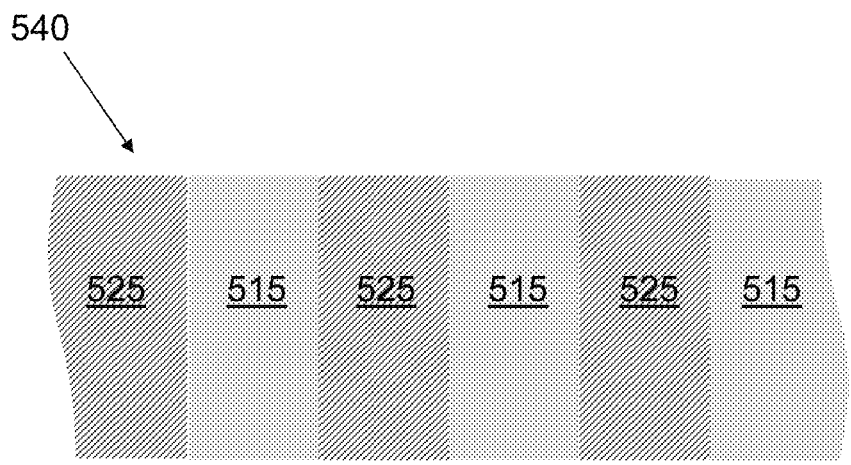

Multiple diblock polymer molecules 500 can arrange themselves to form a first domain 515 of a first phase made of the first polymer blocks 510 and a second domain 525 of a second phase made of the second polymer blocks 520, as shown in FIG. 5B. Diblock polymer molecules 500 can arrange themselves to form multiple repeat domains, thereby forming a continuous nanostructured block copolymer material 540, as shown in FIG. 5C. The sizes or widths of the domains can be adjusted by adjusting the molecular weights of each of the polymer blocks.

In one arrangement the first polymer domain 515 is ionically conductive, and the second polymer domain 525 provides mechanical strength to the nanostructured block copolymer.

Figure 6A:
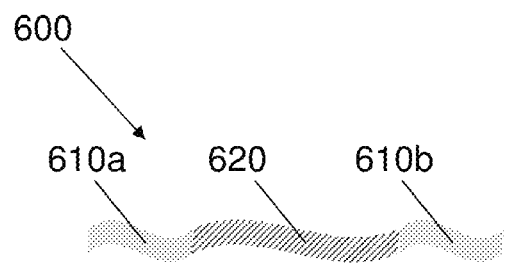
FIG. 6 is a schematic drawing of a triblock copolymer and a domain structure it can form, according to an embodiment of the invention.

FIG. 6A is a simplified illustration of an exemplary triblock polymer molecule 600 that has a first polymer block 610a, a second polymer block 620, and a third polymer block 610b that is the same as the first polymer block 610a, all covalently bonded together. In one arrangement the first polymer block 610a, the second polymer block 620, and the third copolymer block 610b are linear polymer blocks. In another arrangement, either some or all polymer blocks 610a, 620, 610b have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 6B:
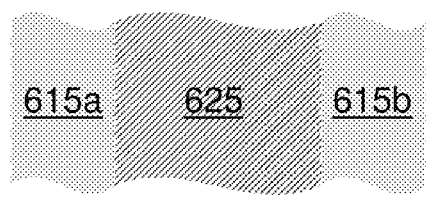
Figure 6C:
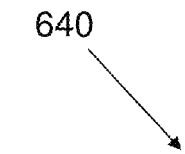

Multiple triblock polymer molecules 600 can arrange themselves to form a first domain 615 of a first phase made of the first polymer blocks 610a, a second domain 625 of a second phase made of the second polymer blocks 620, and a third domain 615b of a first phase made of the third polymer blocks 610b as shown in FIG. 6B. Triblock polymer molecules 600 can arrange themselves to form multiple repeat domains 625, 615 (containing both 615a and 615b), thereby forming a continuous nanostructured block copolymer 630, as shown in FIG. 6C. The sizes of the domains can be adjusted by adjusting the molecular weights of each of the polymer blocks.

In one arrangement the first and third polymer domains 615a, 615b are ionically conductive, and the second polymer domain 625 provides mechanical strength to the nanostructured block copolymer. In another arrangement, the second polymer domain 625 is ionically conductive, and the first and third polymer domains 615 provide a structural framework.

Figure 7A:
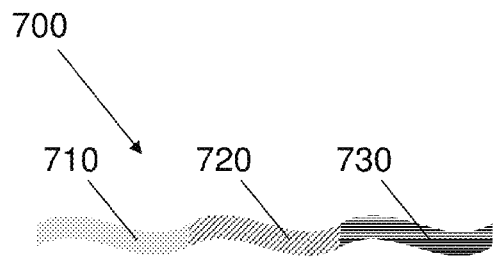
FIG. 7 is a schematic drawing of a triblock copolymer and a domain structure it can form, according to another embodiment of the invention.

FIG. 7A is a simplified illustration of another exemplary triblock polymer molecule 700 that has a first polymer block 710, a second polymer block 720, and a third polymer block 730, different from either of the other two polymer blocks, all covalently bonded together. In one arrangement the first polymer block 710, the second polymer block 720, and the third copolymer block 730 are linear polymer blocks. In another arrangement, either some or all polymer blocks 710, 720, 730 have a comb structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 7B:
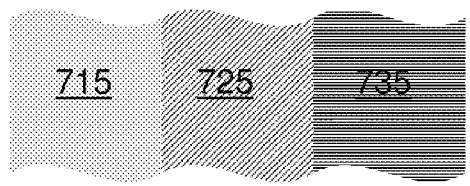
Figure 7C:
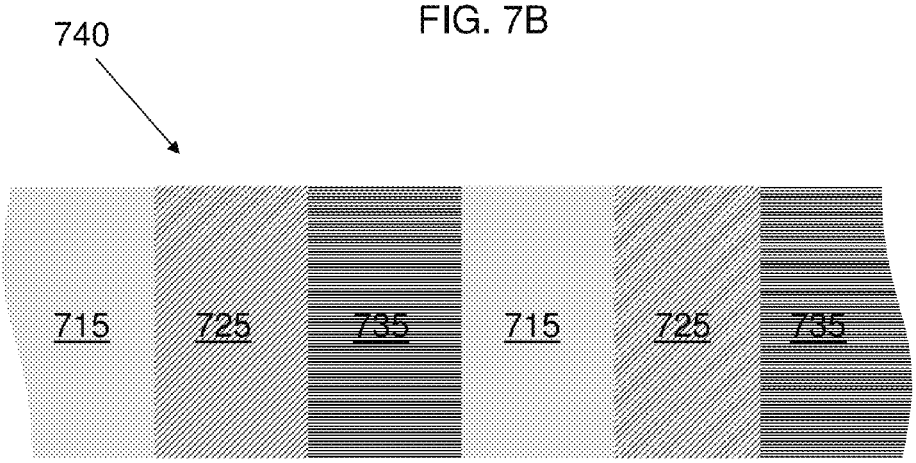

Multiple triblock polymer molecules 700 can arrange themselves to form a first domain 715 of a first phase made of the first polymer blocks 710a, a second domain 725 of a second phase made of the second polymer blocks 720, and a third domain 735 of a third phase made of the third polymer blocks 730 as shown in FIG. 7B. Triblock polymer molecules 700 can arrange themselves to form multiple repeat domains, thereby forming a continuous nanostructured block copolymer 740, as shown in FIG. 7C. The sizes of the domains can be adjusted by adjusting the molecular weights of each of the polymer blocks.

In one arrangement the first polymer domains 715 are ionically conductive, and the second polymer domains 725 provide mechanical strength to the nanostructured block copolymer. The third polymer domains 735 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear polymer. Conductive linear polymers that can be used in the conductive phase include, but are not limited to, polyethers, polyamines, polyimides, polyamides, alkyl carbonates, polynitriles, and combinations thereof. The conductive linear polymers can also be used in combination with polysiloxanes, polyphosphazines, polyolefins, and/or polydienes to form the conductive phase.

In another exemplary embodiment, the conductive phase is made of comb polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in International Patent Application Number PCT/US09/45356, filed May 27, 2009, International Patent Application Number PCT/US09/54709, filed Aug. 22, 2009, International Patent Application Number PCT/US10/21065, filed Jan. 14, 2010, International Patent Application Number PCT/US10/21070, filed Jan. 14, 2010, U.S. International Patent Application Number PCT/US10/25680, filed Feb. 26, 2009, and U.S. International Patent Application Number PCT/US10/25690, filed Feb. 26, 2009, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, LiPF$_6$, LiN(CF$_3$SO$_2$)$_2$, Li(CF$_3$SO$_2$)$_3$C, LiN(SO$_2$CF$_2$CF$_3$)$_2$, LiB(C$_2$O$_4$)$_2$, Li$_2$B$_{12}$F$_x$H$_{12-x}$, Li$_2$B$_{12}$F$_{12}$, and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as poly(2,6-dimethyl-1,4-phenylene oxide) (PXE), polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, such as polyvinylidene fluoride, or copolymers that contain styrene, methacrylate, or vinylpyridine.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and the conducting phase chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008, U.S. patent application Ser. No. 12/271,1828, filed Nov. 14, 2008, and PCT Patent Application Number PCT/US09/31356, filed Jan. 16, 2009, all of which are included by reference herein.

The following examples provide details relating to composition, fabrication and performance characteristics of block copolymer electrolytes in accordance with the present invention. It should be understood the following is representative only, and that the invention is not limited by the detail set forth in these examples.

EXAMPLES

Example 1

Figure 8A:
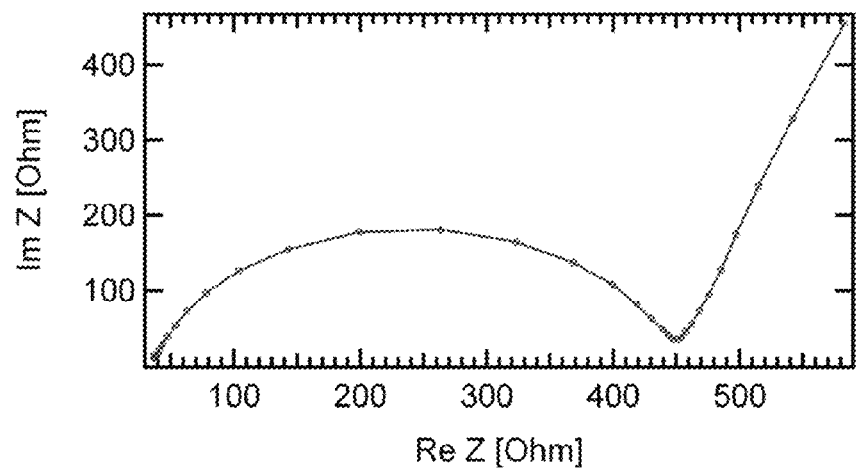
FIGS. 8A and 8B show impedance data and specific capacity data for a cell made according to an embodiment of the invention.
Figure 8B:
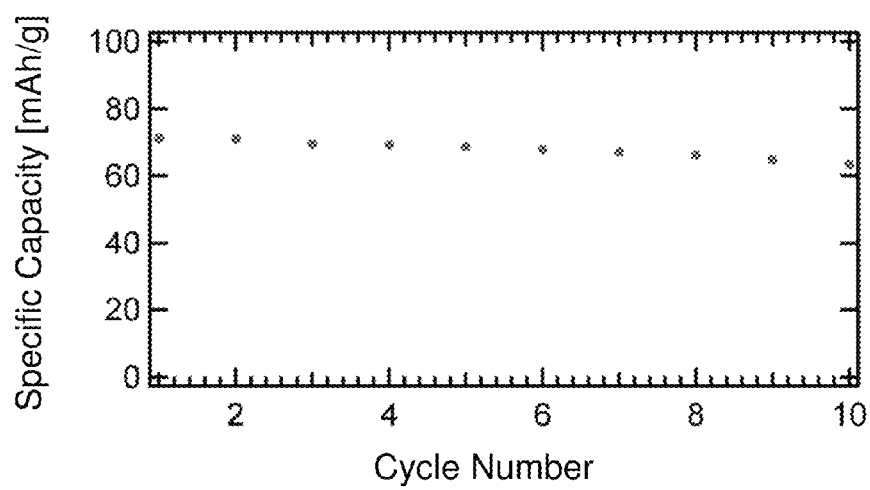

An electrochemical cell similar to the one shown in FIG. 3 was made. The cathode is of the type shown in FIG. 2C and was made of NCA (nickel cobalt alumina) active material particles mixed into a first block copolymer catholyte. The cathode is about 30 μm thick. Adjacent the cathode is a layer of the first block copolymer electrolyte about 50 μm thick. The anode is a lithium foil about 100 μm thick. Between the catholyte and the anode is an anolyte layer of a second block copolymer electrolyte, which is about 25 μm thick. FIG. 8A is a graph showing impedance data from this cell. It is clear that the charge transfer between the anolyte and catholyte layers is very good. Charges move essentially unimpeded. FIG. 8B is a plot of specific capacity as a function of cell cycle number at 80° C. The first few cycles indicate very good capacity retention. There seem to be no adverse effects from using two electrolytes—there is efficient transfer of lithium ions across the cell.

Example 2

Figure 9:
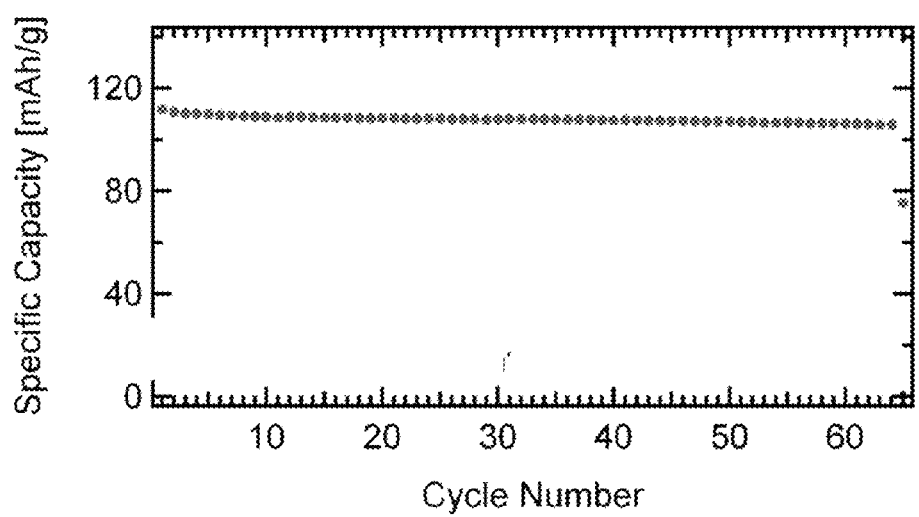
FIG. 9 is a plot of specific capacity as a function of cell cycle number at 80° C. for a cell made according to another embodiment of the invention.

An electrochemical cell similar to the one shown in FIG. 4 was made. The cathode is made of LiFePO$_4$ active material particles mixed into a block copolymer catholyte. The cathode is about 35 μm thick. There are essentially no LiFePO$_4$ particles at the surface of the cathode that are not coated by the catholyte. The anode is a lithium foil about 100 μm thick. Between the cathode (i.e., the very thin layer of catholyte on the surface of the cathode) and the anode is an anolyte layer of a different block copolymer electrolyte, which is about 25 μm thick. FIG. 9 is a plot of specific capacity as a function of cell cycle number at 80° C. Even after more than 60 cycles, there is very little capacity fade. There seem to be no adverse effects from using two electrolytes—there is efficient transfer of lithium ions across the cell.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:
1. An electrochemical cell, comprising:
    a non-porous negative electrode;
    a positive electrode having a porosity of 15% or less; and
    two electrolyte layers between the negative electrode and the positive electrode, the two electrolyte layers comprising:
        a solid anolyte layer adjacent the negative electrode, the solid anolyte layer comprising a first block copolymer electrolyte; and
        a solid catholyte layer between the positive electrode and the anolyte layer;
    wherein the two electrolyte layers are different.
2. The electrochemical cell of claim 1 wherein the anolyte layer and/or the catholyte layer comprises no gel.
3. The electrochemical cell of claim 1 wherein the non-porous negative electrode is a metal film selected from the group consisting of lithium and lithium alloys comprising one or more of Al, Mg, Ag, Sn, Sb, and Pb.
4. The electrochemical cell of claim 1 where the negative electrode is a composite layer of negative electrode active particles, optional electronic conductive additive, and optional binder.
5. The electrochemical cell of claim 4 wherein the negative electrode further comprises a solid polymer electrolyte.
6. The electrochemical cell of claim 4 wherein the negative electrode further comprises a ceramic electrolyte.
7. The electrochemical cell of claim 1 wherein the positive electrode is a composite layer of positive electrode active particles, optional electronic conductive additive, and optional binder.
8. The electrochemical cell of claim 7 wherein the positive electrode further comprises a solid polymer electrolyte.
9. The electrochemical cell of claim 7 wherein the positive electrode further comprises a ceramic electrolyte.
10. The electrochemical cell of claim 7 wherein the positive electrode active particles are selected from the group consisting of nickel cobalt aluminum oxide (NCA), nickel cobalt manganese (NCM), LiCoO$_2$, LiFePO$_4$, LiNiPO$_4$, LiCoPO$_4$, and LiMn$_2$O$_4$ particles, and any combination thereof.
11. The electrochemical cell of claim 7 where the positive electrode active particles further comprise a ceramic electrolyte coating.
12. The electrochemical cell of claim 7 where the positive electrode active particles further comprise an electronically conductive coating or surface.
13. The electrochemical cell of claim 1 wherein the positive electrode and/or the negative electrode further comprise a current collector in electronic communication with the electrode.
14. The electrochemical cell of claim 1 wherein the anolyte layer comprises two sub-layers: a ceramic electrolyte layer and a solid polymer electrolyte layer.
15. The electrochemical cell of claim 14 wherein the ceramic electrolyte layer is adjacent the negative electrode and the solid polymer electrolyte layer is adjacent the ceramic electrolyte layer.
16. The electrochemical cell of claim 1 wherein the anolyte layer further comprises ceramic electrolyte particles.
17. The electrochemical cell of claim 1 wherein the catholyte layer comprises a ceramic electrolyte.
18. The electrochemical cell of claim 17 wherein the ceramic electrolyte comprises one or more materials selected from the group consisting of oxide glasses, oxynitride glasses, sulfide glasses, oxysulfide glasses, lithium nitride glasses, halide-doped glasses, LLTO, Perovskite-type ceramic electrolytes, and Lisicon-type phosphates.
19. The electrochemical cell of claim 17 wherein the catholyte layer comprises two sub-layers: a ceramic electrolyte layer and a solid polymer electrolyte layer.

20. The electrochemical cell of claim 19 wherein the ceramic electrolyte layer is adjacent the positive electrode and the solid polymer electrolyte layer is adjacent the ceramic electrolyte layer.

21. The electrochemical cell of claim 19 wherein the ceramic electrolyte is in the form of a flexible ceramic tape.

22. The electrochemical cell of claim 17 wherein the ceramic electrolyte is in the form of particles and the catholyte layer further comprises a solid polymer electrolyte into which the ceramic electrolyte particles are distributed.

23. The electrochemical cell of claim 1 wherein the catholyte layer comprises a second block copolymer electrolyte.

24. The electrochemical cell of claim 1 wherein the first block copolymer is either a diblock copolymer or a triblock copolymer.

25. The electrochemical cell of claim 24 wherein the first block copolymer further comprising at least one lithium salt.

26. The electrochemical cell of claim 24 wherein a first block of the first block copolymer is ionically conductive and is selected from the group consisting of polyethers, polyamines, polyimides, polyamides, alkyl carbonates, polynitriles, polysiloxanes, polyphosphazines, polyolefins, polydienes, and combinations thereof.

27. The electrochemical cell of claim 24 wherein a first block of the first block copolymer comprises an ionically-conductive comb polymer, comprising a backbone and pendant groups.

28. The electrochemical cell of claim 27 wherein the backbone is selected from the group consisting of polysiloxanes, polyphosphazines, polyethers, polydienes, polyolefins, polyacrylates, polymethacrylates, and combinations thereof.

29. The electrochemical cell of claim 27 wherein the pendant groups are selected from the group consisting of oligoethers, substituted oligoethers, nitrile groups, sulfones, thiols, polyethers, polyamines, polyimides, polyamides, alkyl carbonates, polynitriles, other polar groups, and combinations thereof.

30. The electrochemical cell of claim 24 wherein a second block of the first block copolymer is selected from the group consisting of PXE, polystyrene, polymethacrylate, poly(methyl methacrylate), polyvinylpyridine, polyvinylcyclohexane, polyimide, polyamide, polypropylene, poly(2,6-dimethyl-1,4-phenylene oxide) (PXE), polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

31. The electrochemical cell of claim 1 wherein the anolyte layer is reductively stable against the negative electrode down to about 0.2V vs $Li/Li^+$.

32. The electrochemical cell of claim 1 wherein the catholyte layer is oxidatively stable against the positive electrode up to about 4.5V vs $Li/Li^+$.

33. The electrochemical cell of claim 1 wherein the catholyte layer is oxidatively stable against the positive electrode up to about 5.5V vs $Li/Li^+$.

34. The electrochemical cell of claim 1 wherein the catholyte layer is oxidatively stable against the positive electrode up to about 6.7V vs $Li/Li^+$.

35. An electrochemical cell, comprising:
a non-porous negative electrode;
a positive electrode composite layer having a porosity of 15% or less, the positive electrode comprising positive electrode active particles that have a ceramic electrolyte coating, optional electronic conductive additive, and optional binder;
two electrolyte layers between the negative electrode and the positive electrode, the two electrolyte layers comprising:
a solid anolyte layer adjacent the negative electrode, the solid anolyte layer comprising a block copolymer electrolyte; and
a solid catholyte layer between the positive electrode and the anolyte layer;
wherein the two electrolyte layers are different.

* * * * *